United States Patent [19]

De Man et al.

[11] Patent Number: 4,888,723

[45] Date of Patent: Dec. 19, 1989

[54] ARRANGEMENT FOR BIT-PARALLEL ADDITION OF BINARY NUMBERS WITH CARRY-SAVE OVERFLOW CORRECTION

[75] Inventors: Erik De Man; Tobias Noll, both of Munich, Fed. Rep. of Germany

[73] Assignee: Siemens Aktiengesellschaft, Berlin, Munich, Fed. Rep. of Germany

[21] Appl. No.: 60,169

[22] Filed: Jun. 10, 1987

[30] Foreign Application Priority Data

Jun. 10, 1986 [DE] Fed. Rep. of Germany ....... 3619437

[51] Int. Cl.⁴ .............................................. G06F 7/50
[52] U.S. Cl. ................................................... 364/786
[58] Field of Search ................................. 364/784–788

[56] References Cited

U.S. PATENT DOCUMENTS 4,110,832  8/1987  Leininger et al. .................. 364/786
4,819,198  4/1989  Noll et al. ........................... 364/787

FOREIGN PATENT DOCUMENTS 3524797  1/1987  Fed. Rep. of Germany .

OTHER PUBLICATIONS

J. Jump et al., "Effective Pipelining of Digital Systems", IEEE Trans. on Computers, vol. C-27, No. 9, Sep., 1978, pp. 855-865.

K. Hwang, "Computer Arithmetic", John Wiley & Sons (1979), pp. 98-103.

Primary Examiner—Emanuel S. Kemeny
Assistant Examiner—Long T. Nguyen
Attorney, Agent, or Firm—Hill, Van Santen, Steadman & Simpson

[57] ABSTRACT

A series of adders ($AD_i$) with inputs for binary number bits of the same significance, which output intermediate sum and carry words that are combined to form sum words, are provided for the bit-parallel addition of binary numbers in two's complement with carry-save overflow correction. For the correction of overflow errors, the carry bit of the adder ($AD_{n-2}$) having the second highest significance is replaced by the carry bit of the most significant adder ($AD_{n-1}$) and, in case the carry bits of the two most significant adders ($AD_{n-1}$, $AD_{n-2}$) are unequal, the intermediate sum bit of the most significant adder ($AD_{n-1}$) is replaced by the carry bit thereof. The element $AD_{kn-1}$ has the same number of transistors as the other adders $AD_0 \ldots AD_{n-2}$.

2 Claims, 4 Drawing Sheets

| $a_{n-2}$ | $b_{n-2}$ | $d_{n-2}$ | $c'_{n-1}$ | $s'_{n-2}$ |
|---|---|---|---|---|
| 0 | 0 | 0 | 1 | 1 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 0 | 0 |

| $a_{n-1}$ | $b_{n-1}$ | $d_{n-1}$ | $c'_{n-1}$ | $c'_n$ | $s_{(n-1)k}$ |
|---|---|---|---|---|---|
| 0 | 0 | 0 | 0 | 1 | 1 |
| 0 | 0 | 0 | 1 | 1 | 1 |
| 0 | 0 | 1 | 0 | 1 | 1 |
| 0 | 0 | 1 | 1 | 1 | 0 |
| 0 | 1 | 0 | 0 | 1 | 1 |
| 0 | 1 | 0 | 1 | 1 | 0 |
| 0 | 1 | 1 | 0 | 0 | 1 |
| 0 | 0 | 1 | 1 | 0 | 0 |
| 1 | 0 | 0 | 0 | 1 | 1 |
| 1 | 0 | 0 | 1 | 1 | 0 |
| 1 | 0 | 1 | 0 | 0 | 1 |
| 1 | 0 | 1 | 1 | 0 | 0 |
| 1 | 1 | 0 | 0 | 0 | 1 |
| 1 | 1 | 0 | 1 | 0 | 0 |
| 1 | 1 | 1 | 0 | 0 | 0 |
| 1 | 1 | 1 | 1 | 0 | 0 |

ARRANGEMENT FOR BIT-PARALLEL ADDITION OF BINARY NUMBERS WITH CARRY-SAVE OVERFLOW CORRECTION

BACKGROUND OF THE INVENTION

The invention is directed to an arrangement for bit-parallel addition of binary numbers in two's complement with carry-save overflow correction.

An arrangement of this kind is known from the book *Computer Arithmetic* by K. Hwang, John Wiley and Sons, New York, 1979, pp. 98–103, FIG. 4.2. Every first adder has three inputs that receive equivalent bits of the three binary numbers to be added to one another. The sum outputs of the first adders are connected to first inputs of the adder device and the carry outputs of the first adders (with the exception of the most significant adder) are connected to second inputs of the adder device. A sum word appears at the outputs of the latter as result of the addition. In contrast to an adder arrangement having a carry-propagate, the carries of all the first adders are simultaneously formed and, as a carry word, are available for an addition in the adder device with the intermediate sum word formed by the first adders. An adder arrangement constructed in this way works on what is referred to as the "carry-save" principle.

Given a "carry-save" arrangement for the addition of binary numbers in two's complement, an overflow can occur, because of the separate representation of the sum supplied by the first adders in the form of an intermediate sum word and of a carry word, this overflow leading to an incorrect addition result. Such an error arises when relatively small sum words are formed from larger intermediate sum words and carry words having the opposite operational sign.

BRIEF DESCRIPTION OF THE INVENTION

The object of the invention is to provide an arrangement of the above-described type wherein the overflow does not occur, and which is constructed of optimally simple, fast and space-saving adder circuits. This is achieved in accord with the invention by fashioning the arrangement with a correction element integrated into the most significant adder. The advantage obtainable with the invention is that intermediate sum words and carry words which would produce such an overflow error are brought into a form—only in the region of the two most significant first adders—by means of simple correction measures which avoid the appearance of erroneous addition results; and in that the most significant adder with correction element is integrated in an arrangement which has the same number of transistors as the other adders.

BRIEF DESCRIPTION OF THE DRAWINGS

The invention shall be set forth in greater detail below with reference to preferred exemplary embodiments shown in the drawings, in which:

FIG. 3 shows a CMOS realization of an adder stage without a correction element in accord with the function table in FIG. 2;

FIG. 4 is a function table for the most significant adder stage with a correction element.

DESCRIPTION OF THE PREFERRED EMBODIMENT

Figures 1, 2:
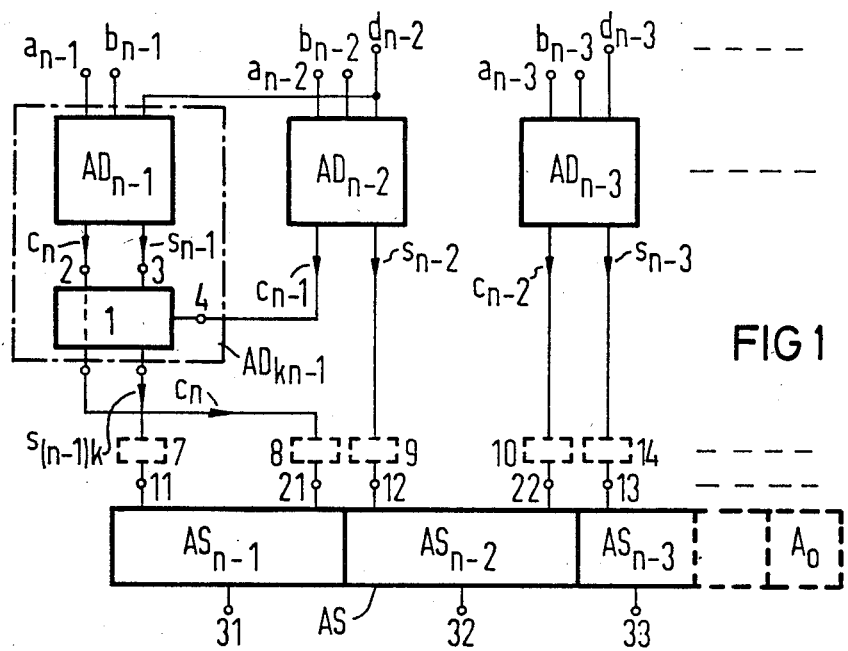
FIG. 1 shows an arrangement for bit-parallel addition of three binary numbers.
FIG. 2 is a function table for an adder stage without a correction element.

FIG. 1 shows three adders $AD_{n-1}$, $AD_{n-2}$ and $AD_{n-3}$, each of which has three inputs. The first input of $AD_{n-1}$ receives the most significant bit $a_{n-1}$ of an n-place binary number A represented in two's complement; the first input of $AD_{n-2}$ receives $a_{n-2}$ and the first input of $AD_{n-3}$ receives $a_{n-3}$. The first inputs of further adders (not shown) receive the further bits $a_{n-4}$ through $a_0$. In an analogous fashion, second inputs of the individual adders $AD_i$ receive the individual bits $b_{n-1}$, $b_{n-2}$ ... of a binary number B represented in two's complement, whereas third inputs of these adders are respectively wired with the individual bits $d_{n-2}$, $d_{n-3}$ ... of a third binary number D. The number D is interpreted as a (n-1)-place binary number which is expanded into an n-place binary number by a doubling of its operational sign, whereby the operational sign bits are respectively supplied to the third inputs of $AD_{n-1}$ and $AD_{n-2}$.

The result arising by the addition of A, B and D is indicated by two separate signals in accord with the "carry-save" principle, namely by an intermediate sum word $s_{n-1}$, $s_{n-2}$, $s_{n-3}$ ... $s_0$ that can be taken bit-by-bit at the sum outputs of the adders $AD_i$, and by a carry word $c_n$, $c_{n-1}$, $c_{n-2}$ ... $c_1$ that can be taken bit-by-bit at the carry outputs of $AD_i$. The two words are now combined in an adder means AS comprising individual adders $AS_{n-1}$, $AS_{n-2}$ ... $AS_0$, and combined therein to form the sum word representing the result of $A+B+D$. To this end, first inputs 11, 12, 13, etc., of AS receive, in a traditional way, the individual bits $s_{n-1}$, $s_{n-2}$, $s_{n-3}$, etc., of the intermediate sum word, and second inputs 21, 22, etc., receive, in a traditional way, the bits $c_{n-1}$, $c_{n-2}$, etc., of the carry word. The most significant bit $c_n$ of the carry word is left out of consideration at first. The sum word is then available at the outputs 31, 32, 33, etc.

A previously known arrangement could be illustrated in FIG. 1 by direct connections (not shown therein) of the sum bit $s_{n-1}$ to the input 11 and of the carry bit $c_{n-1}$ to the input 21, and by the indicated connections of inputs 12, 13 and 22.

Let it be assumed, for a first numerical example with n=2, so that merely two-place binary numbers are considered, that $A=-2$, $B=0$ and $D=-1$, such that $A=10$, $B=00$ and $D=11$ in two's complement. Then an intermediate sum word $s_1$, $s_0=0$, 1 corresponding to the value $+1$ as well as a carry word $c_2$, $c_1$, $c_0=1$, 0, 0 corresponding to the value $-4$ are produced. Since, however, $c_2$ is to be left out of consideration in the addition so that a further adder $AS_n$ does not have to be separately provided, an overflow results which, given omission of $c_2$, leads to a carry word $c_1$, $c_0=0$ 0 corresponding to the value 0 and, thus, leads to the partial sums $+1$ (from the intermediate sum word) and 0 (from the carry word) resulting in an erroneous result of $+1$. If, however, the carry word $c_2$, $c_1$, $c_0$ were allowed, then this yields a correct result of $-3$.

In a second numerical example with n=2, let $A=1$, $B=1$ and $D=-1$. In two's complement, that corresponds to the numbers $A=01$, $B=01$ and $D=11$. The addition then leads to the partial sums $s_1$, $s_0=1$, 1 corresponding to the value -1 and $c_1$, $c_0=1$, 0 having the value $-2$, i.e. which produces the erroneous result of $-3$. Only when $c_2=0$ is taken into consideration does a partial sum $c_2$, $c_1$, $c_0$ of 0, 1, 0, with the value of $+2$ and, together with $s_1$, $s_0$, produce the correct result $+1$. If $c_2$ is omitted, however, then an overflow effect also exists here.

In accord with the invention, then, the most significant adder $AD_{n-1}$ is followed by a correction element 1 that comprises three inputs 2 through 4, and is integrated in an arrangement $AD_{kn-1}$ together with the adder $AD_{n-1}$. Of these, the input 2 receives $c_n$, the input 3 receives $s_{n-1}$ and the input 4 receives $c_{n-1}$. One output 5 of the correction element 1 is connected to the input 21 of AS and a second output 6 is connected to the input 11 of AS. $c_n$ and $c_{n-1}$ are compared to one another in the correction element 1. When $c_n \neq c_{n-1}$, then the carry bit $c_n$ pending at 2 is through-connected, instead of $s_{n-1}$ being through-connected to the output 6. Only given $c_n = c_{n-1}$ is $s_{n-1}$ applied to the output 6 and, thus, to the input 11. The sum bit at the output 6 which has been corrected to this degree is referenced as $s_{(n-1)k}$. The output 5 is always wired with $c_n$, this being indicated in FIG. 1 by a broken-line connection between terminals 2 and 5. $c_n$ is, thus, always connected through to the input 21 of $AS_{n-1}$. As a result, the intermediate sum words and carry words arising at the outputs of the adders $AD_i$ are successively corrected, given the occurrence of conditions which would cause an overflow effect, such that the correct result is formed, without the need of a further adder $AS_n$ in AS.

In the case of the first numerical example, the correction element executes the following corrections; $c_1$ is replaced by $c_2=1$, so that the corrected partial sum $-2$ is produced, given consideration of the place value of $c_1$. Further, $s_{1k}=1$, so that the sum word $s_{1k}$, $s_0$ becomes 1, 1 and, thus, a corrected partial sum of $-1$ is produced. At the outputs 31, 32 . . . , the two corrected partial sums yield a sum word that corresponds to the desired addition result of -3.

In the second numerical example, the correction element 1 results in the following: $c_1$ is replaced by $c_2=0$, so that the corrected partial sum 0 is produced. Further, $s_{1k}=0$, so that the sum word $s_{1k}$, $s_0$ becomes 0, 1 and, thus, corresponds to a corrected partial sum of $+1$. At the outputs 31, 32 . . . , the two corrected partial sums then yield a sum word that corresponds to the correct addition result of $+1$.

The corrective measures undertaken by the correction element 1 can also be applied in a circuit for addition of three or more place binary numbers A, B and D, since, of course, the carry bit $c_{n-2}$—which is no longer to be left out of consideration in this case—would not have to be involved in the correction measures.

The carry bits and intermediate sum bits of the adders $AD_i$ can be intermediately stored with intermediate memories 7, 9, 14 . . . and 8, 10 . . . which precede the inputs 11, 12 . . . and 21, 22 . . . and can be transmitted in common to the adders $AS_i$ in synchronism with a clock pulse. Such an arrangement can be expanded in such a fashion that the outputs of the registers 7, 9, 14 . . . and 8, 10 . . . are supplied to the first and second inputs of a line of second adders $AD_i'$, whereby the outputs of registers 7', 9' . . . and 8', 10' . . . are connected to the inputs 11, 12 . . . and 21, 22 . . . of AS. On the other hand, the line of second adders can be followed by identically constructed lines of third and fourth adders, each with following intermediate memories, with the intermediate memory outputs of the last of these adder lines being wired to the specified inputs of the adder device AS. The intermediate memories are clocked such that the intermediate sums and carry words of a given line are respectively transmitted onto the next line in common, whereby each line is charged—at the same clock time—with the intermediate sum and carry words of the preceding line that belong to another addition operation.

This system of step-by-step forwarding of the addition results from line to line and of simultaneous processing of different addition operations in the individual cells respectively separated from one another by intermediate memories is referred to as "pipelining" in the literature. See "IEEE Transactions on Computers", Vol. C-27, No. 9, Sept. 1978, pp. 855–865, in this regard. In every adder line $AD_i$, $AD_i'$, etc., a correction element 1, 1', etc., respectively follows the most significant adder $AD_{n-1}$, $AD_{n-1}'$, etc., in accord with the invention in order to avoid addition errors as a consequence of overflow effects.

FIG. 2 shows a function table for the adder $AD_{n-2}$ without a correction element, which also applies to the adders $AD_0 \ldots AD_{n-3}$. The bits $a_{n-2}$, $b_{n-2}$, $d_{n-2}$ supplied to the three inputs of this sub-circuit are shown in each line, and the bits $c_{n-1}$ and $s_{n-2}$ appearing at its outputs are indicated in the last two columns of each line, these being are indicated in inverted form as $c'_{n-1}$ and $s'_{n-2}$.

Figure 3:
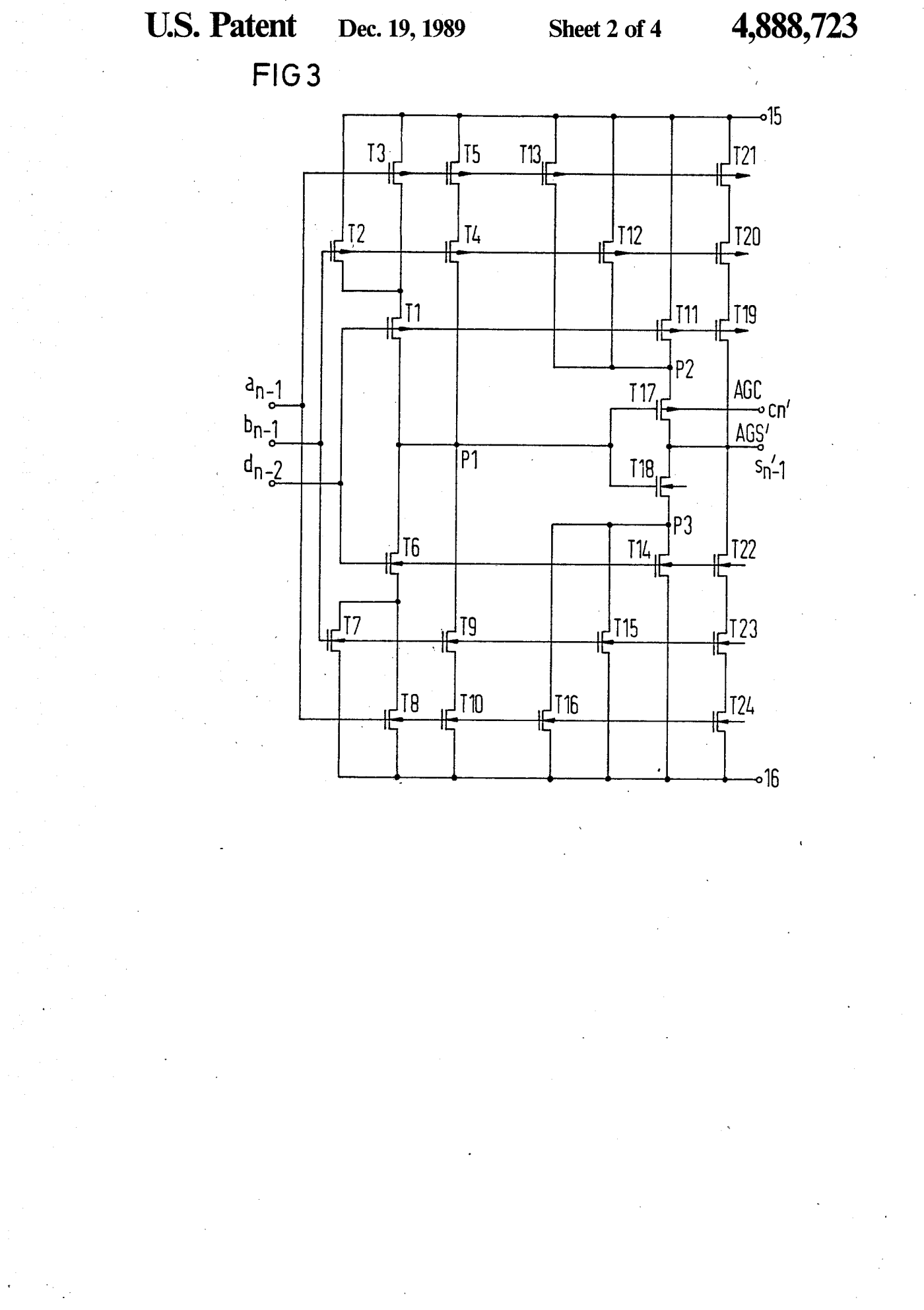

FIG. 3 shows an exemplary circuit of the adder $AD_{n-1}$ executed in CMOS technology which has the adders $AD_0$ and $AD_{n-2}$ and which fulfills the function table of FIG. 2. A circuit point P1 is connected to a terminal 15 via three two-element transistor series circuits, and the terminal 15 is wired to a supply voltage $V_{DD}$. The first transistor series circuit is composed of the p-channel switching transistor T1 and T2, the second is composed of the p-channel switching transistors T1 and T3 and the third is composed of the p-channel switching transistors T4 and T5. The gate of T1 is selectable by the third input of $AD_{n-1}$ which receives $d_{n-2}$, the gates of T2 and T4 are selectable by the second input, receiving $b_{n-1}$ and the gates of T3 and T5 are selectable by the first input which receives $a_{n-1}$. On the other hand, P1 is connected to a terminal 16 that is wired to a reference potential, via three two-element transistor series circuits. Each of these series circuits T6 and T7, T6 and T8 as well as T9 and T10, is constructed of n-channel field effect transistors. The gate of T6 is selected with $d_{n-2}$, the gates of T7 and T9 are selected with $b_{n-1}$ and the gates of T8 and T9 are selected with $a_{n-1}$. The circuit point P1 corresponds to a carry output AGC of $AD_{n-1}$, from which the inverted carry signal $c_n'$ can be taken.

Another circuit point P2 is respectively connected to the terminal 15 via three p-channel switching transistors T11 through T13. A third circuit point P3 is connected to the terminal 16 via three n-channel switching transistors T14 through T16. T11 and T14 are both selectable by $d_{n-2}$, T12 and T15 are both selectable by $b_{n-1}$ and T13 and T16 are both selectable by $a_{n-1}$. The circuit points P2 and P3 are connected to one another via the series circuit of a p-channel switching transistor T17 and of an n-channel switching transistor T18, and the gates of T17 and T18 are connected to P1. The junction of T17 and T18 represents an output AGS' of $AD_{n-1}$ at which the inverted sum bit $s_{n-1}'$ appears. This latter output is additional connected to terminal 15 via a three-element series circuit of p-channel switching transistors T19 through T21, and is connected to the circuit point 16 via a three-element series circuit of n-channel switching transistors T22 through T24. The gates of T19 and T22 are selectable with $d_{n-2}$, the gates of T20 and T23 are selectable with $b_{n-1}$ and the gates of T21 and T24 are selectable with $a_{n-1}$.

FIG. 4 shows a function table for the most significant adder $AD_{n-1}$ and the integrated correction element 1. The bits $a_{n-1}$, $b_{n-1}$, $d_{n-1}$ $c'_{n-1}$, which are supplied to the four inputs of this sub-circuit, are listed in each line, and the bits $c_n'$ and $s'_{(n-1)k}$ respectively appearing at the outputs 5 and 6, are indicated in the last two columns of each line.

Figure 5:
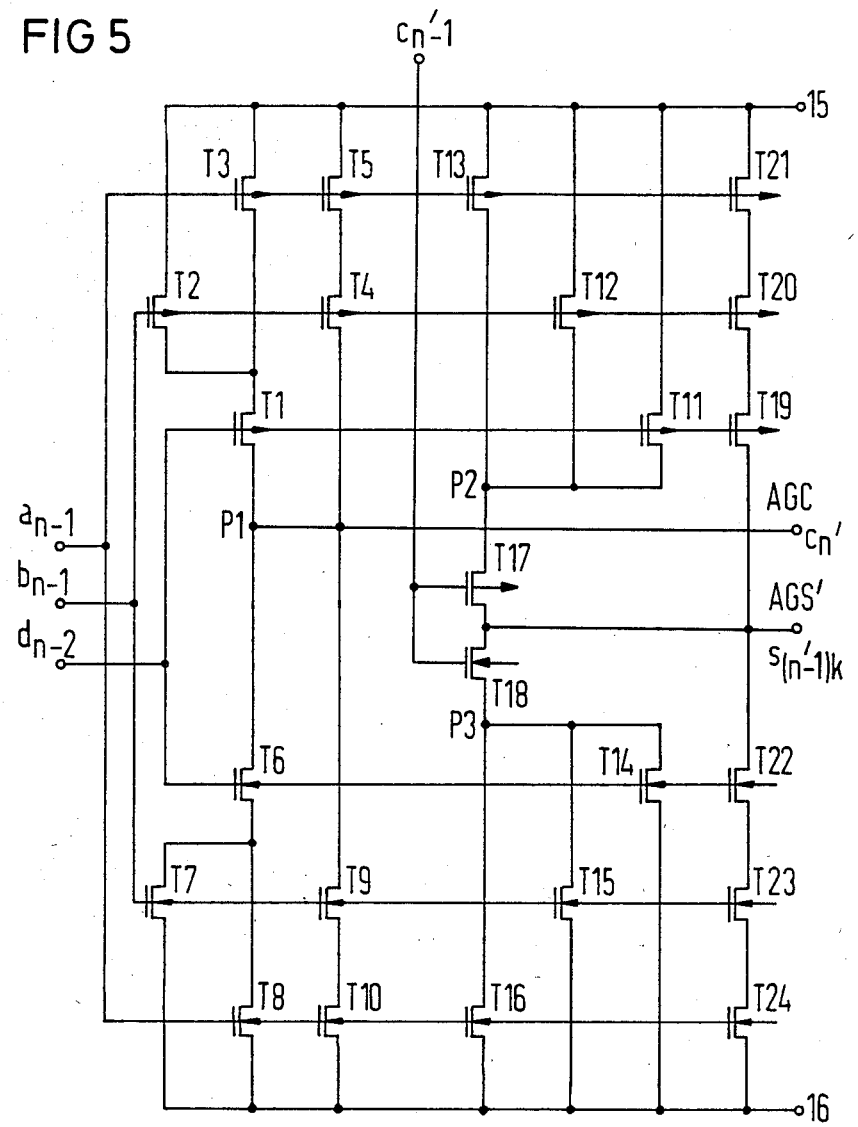
FIG. 5 shows a CMOS realization of the most significant adder stage, with a correction element described by the function table in FIG. 4.

FIG. 5 shows an exemplary circuit in CMOS technology of the sub-circuit composed of $AD_{n-1}$ with the correction element 1 which fulfills the function table of FIG. 4. This sub-circuit is similar to the circuit of FIG. 3, with slight modifications or, expansions. To this end, the output AGC continues to be connected to the point P1. The gates of the switching transistors T17 and T18, however, are not selected by the signal at point P1, but with the inverted carry bit $c_{n-1}'$.

It will be apparent to those skilled in the art that various modifications and additions may be made in the apparatus of the present invention without departing from the essential features of novelty thereof, which are intended to be defined and by the appended claims.

What is claimed is:

1. A circuit arrangement for bit-parallel addition of binary numbers in two's complement having carry-save overflow correction, comprising in combination: a group of n first adders (ADi), where n is a positive integer and i indicates individual ones of said group, each of said first adders having three inputs for binary number bits of the same significance, a sum output and a carry output for manifesting an intermediate sum bit and a carry bit, and an adder device (AS) for the formation of a sum word from a carry word composed of carry bits and from an intermediate sum word composed of intermediate sum bits, whereby the carry bit ($C_{n-1}$) of the adder ($AD_{n-2}$) having the second-highest significance is replaced by the carry bit ($C_n$) of the most significant one of said first adders ($AD_{n-1}$), and the most significant first adder ($AD_{n-1}$) has a first correction element (1) connected to receive the carry bit of the second most significant adder, said correction element replacing the intermediate sum bit ($S_{n-1}$) of the most significant first adder by the carry bit ($C_n$) of the most significant first adder ($AD_{n-1}$) in case the carry bits of said most significant first adder and of the second most significant first adder are unequal, said most significant first adder ($AD_{n-1}$) and said correction element (1) being integrated in one arrangement ($AD_{kn-1}$), and said most significant first adder ($AD_{n-1}$) with said correction element (1) having the same number of transistors as the other adders ($AD_0, \ldots, AD_{n-2}$).

2. The arrangement according to claim 1, wherein said most significant first adder ($AD_{n-1}$) has a first circuit point (P1) connected to a first terminal (15) via three two-element series circuits of field effect transistors of a first channel type (T1, T2; T3; T4, T5), said first terminal being connected to a supply voltage; said first circuit point (P1) being connected to a second terminal (16) via three two-element series circuits of field effect transistors of a second channel type (T6, T7; T6, T8; T9, T10), said second terminal being connected to a reference potential; a second circuit point (P2) connected to said first terminal (15) via three field effect transistors of said first channel type (T11, T12, T13): a third circuit point (P3) connected to said second terminal (16) via three field effect transistors of said second channel type (T14, T15, T16); said second circuit point (P2) being connected to receive a first inverted signal corresponding to the inverted sum output (AGS') of said correction element (1) via a field effect transistor of said first channel type (T17); said third circuit point (P3) being connected to said first inverted signal via a field effect transistor of said second channel type (T18); the gates of said transistors of said two-element series circuits being selectable via three inputs ($A_{n-1}$, $B_{n-1}$ and $D_{n-2}$) of said most significant first adder; whereby simultaneous signals of one polarity at two of said three inputs respectively switch one of said series circuits of transistors of said first channel type into conductio, and whereby simultaneous signals of opposite polarity at two of said three inputs respectively switch one of said three two-element series circuits of transistors of said second channel type into conduction; the gates of said three field effect transistors of said first channel type, and the gates of said three field effect transistors of said second channel type being each connected to one of the three inputs of said most significant first adder; said first circuit point (P1) being connected to receive a second inverted signal corresponding to the inverted carry output (AGC) of said most significant first adder; the gates of said field effect transistors (T17, T18) being wired to receive a third inverted signal corresponding to the inverted carry output ($C_{n-1}'$) of the second most significant adder; said first inverted signal being connected to said first terminal (15) via a three-element series circuit of field effect transistors of said first channel type (T19, T20, T21) and to said second terminal (16) via a three-element series circuit of field effect transistors of said second channel type (T22, T23, T24), and connecting means connecting the gates of the field effect transistors of each of said three-element series circuits respectively to one of said three inputs of said first most significant adder, said connecting means connecting each of said three inputs to the gate of one field effect transistor in each of said three-element series circuits.

* * * * *